(12) United States Patent
Ahn et al.

(10) Patent No.: US 10,454,605 B2
(45) Date of Patent: Oct. 22, 2019

(54) METHOD AND APPARATUS FOR MONITORING CONTROL CHANNEL IN UNLICENSED BAND (71) Applicant: LG ELECTRONICS INC., Seoul (KR)

(72) Inventors: Joonkui Ahn, Seoul (KR); Kijun Kim, Seoul (KR); Suckchel Yang, Seoul (KR); Hanjun Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/772,772

(22) PCT Filed: Nov. 2, 2016

(86) PCT No.: PCT/KR2016/012542
§ 371 (c)(1),
(2) Date: May 1, 2018

(87) PCT Pub. No.: WO2017/078411
PCT Pub. Date: May 11, 2017

(65) Prior Publication Data
US 2019/0229825 A1     Jul. 25, 2019

Related U.S. Application Data

(60) Provisional application No. 62/249,889, filed on Nov. 2, 2015, provisional application No. 62/256,142, filed
(Continued)

(51) Int. Cl.
*H04J 11/00* (2006.01)
*H04L 27/26* (2006.01)
(Continued)

(52) U.S. Cl.
CPC ........ *H04J 11/0069* (2013.01); *H04L 5/0053* (2013.01); *H04L 5/0098* (2013.01);
(Continued)

(58) Field of Classification Search
CPC .. H04J 11/0069; H04L 5/0053; H04L 5/0098; H04L 27/2602; H04L 1/0061;
(Continued)

(56) References Cited

U.S. PATENT DOCUMENTS 10,009,153 B2 * 6/2018 Nory ..................... H04L 5/0053
2014/0112289 A1   4/2014 Kim et al.
(Continued)

FOREIGN PATENT DOCUMENTS

CN   101848483 A   9/2010
CN   103733549 A   4/2014
(Continued)

OTHER PUBLICATIONS

Intel Corporation, "DL Sub-frame Structure and (e)PDCCH," R1-155316, 3GPP TSG RAN WG1 Meeting #82bis, Malmo, Sweden, Sep. 26, 2015, see section 2.
(Continued)

*Primary Examiner* — Duc C Ho
(74) *Attorney, Agent, or Firm* — Dentons US LLP (57) ABSTRACT

Provided are a method for monitoring a control channel in an unlicensed band and an apparatus using the same. In an unlicensed cell, a user equipment (UE) monitors a physical downlink control channel (PDCCH) having burst control information in a search space defined in a control region of a subframe. The control region comprises a plurality of control channel elements (CCEs) starting from an index 0, and the search space is defined only in, from among the plurality of CCEs, first four CCEs and first eight CCEs.

12 Claims, 7 Drawing Sheets

Related U.S. Application Data on Nov. 17, 2015, provisional application No. 62/257,017, filed on Nov. 18, 2015, provisional application No. 62/288,393, filed on Jan. 28, 2016.

(51) Int. Cl.
| | |
|---|---|
| *H04L 5/00* | (2006.01) |
| *H04W 16/14* | (2009.01) |
| *H04W 24/08* | (2009.01) |
| *H04W 72/04* | (2009.01) |
| *H04W 88/06* | (2009.01) |
| *H04L 1/00* | (2006.01) |

(52) U.S. Cl.
CPC ......... *H04L 27/2602* (2013.01); *H04W 16/14* (2013.01); *H04W 24/08* (2013.01); *H04W 72/042* (2013.01); *H04L 1/0061* (2013.01); *H04L 5/001* (2013.01); *H04W 88/06* (2013.01)

(58) Field of Classification Search
CPC ...... H04L 5/001; H04W 16/14; H04W 24/08; H04W 72/042; H04W 88/06
See application file for complete search history.

(56) References Cited

U.S. PATENT DOCUMENTS

| | | | |
|---|---|---|---|
| 2015/0215097 A1* | 7/2015 | Yi | H04W 52/48 370/329 |
| 2016/0278118 A1* | 9/2016 | Yerramalli | H04L 5/001 |
| 2016/0337880 A1* | 11/2016 | Nogami | H04W 24/02 |
| 2018/0295649 A1* | 10/2018 | Bhorkar | H04L 5/0053 |

FOREIGN PATENT DOCUMENTS

| | | |
|---|---|---|
| KR | 1020130007642 | 1/2013 |
| KR | 1020140097206 | 8/2014 |
| WO | 2012141513 | 10/2012 |
| WO | 2013006006 | 1/2013 |

OTHER PUBLICATIONS

ZTE, "Discussion on Scheduling Combinations for LAA", 3GPP TSG RAN WG1 Meeting #82bis, Oct. 5-9, 2015, R1-155257.

LG Electronics, "Initial signal in LAA", 3GPP TSG RAN WG1 Meeting #82bis, Oct. 5-9, 2015, R1-155391.

Nokia Networks, "On DL transmission detection and UL subframe indication for LAA", 3GPP TSG RAN WG1 Meeting #82bis, Oct. 5-9, 2015, R1-155602.

\* cited by examiner

METHOD AND APPARATUS FOR MONITORING CONTROL CHANNEL IN UNLICENSED BAND

CROSS-REFERENCE TO RELATED APPLICATIONS

This application is the National Stage filing under 35 U.S.C. 371 of International Application No. PCT/KR2016/012542, filed on Nov. 2, 2016, which claims the benefit of U.S. Provisional Applications No. 62/249,889 filed on Nov. 2, 2015, No. 62/256,142 filed on Nov. 17, 2015, No. 62/257,017 filed on Nov. 18, 2015 and No. 62/288,393 filed on Jan. 28, 2016, the contents of which are all hereby incorporated by reference herein in their entirety.

BACKGROUND OF THE INVENTION

Field of the Invention

The present invention relates to wireless communication, and more particularly, to a method of monitoring a control channel in an unlicensed band, and an apparatus using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since a base station cannot guarantee an exclusive use of an unlicensed band, there is a need to design a control channel for a transmission of control information. Further, considering compatibility with the conventional LTE based control channel is also required.

SUMMARY OF THE INVENTION

The present invention provides a method for monitoring a control channel in an unlicensed band and an apparatus using the method.

In an aspect, a method for monitoring a control channel in an unlicensed band is provided. The method includes determining, by a user equipment (UE), a search space for monitoring a physical downlink control channel (PDCCH) having burst control information in a control region of a subframe in an unlicensed cell, and monitoring, by the UE, the PDCCH in the search space of the subframe. The control region comprises a plurality of control channel elements (CCEs) starting from an index 0, and the search space is defined only in first 4 CCEs and first 8 CCEs among the plurality of CCEs.

The burst control information may comprise information indicating a region used for a transmission of a downlink (DL) channel in the subframe.

In another aspect, an apparatus for monitoring a control channel in an unlicensed band includes a transceiver configured to transmit and receive a radio signal, and a processor coupled to the transceiver. The processor is configured to determine a search space for monitoring a physical downlink control channel (PDCCH) having burst control information in a control region of a subframe in an unlicensed cell, and monitor the PDCCH in the search space of the subframe. The control region comprises a plurality of control channel elements (CCEs) starting from an index 0, and the search space is defined only in first 4 CCEs and first 8 CCEs among the plurality of CCEs.

A control channel can be monitored in an unlicensed band while maintaining compatibility with a control channel of the conventional 3GPP LTE.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
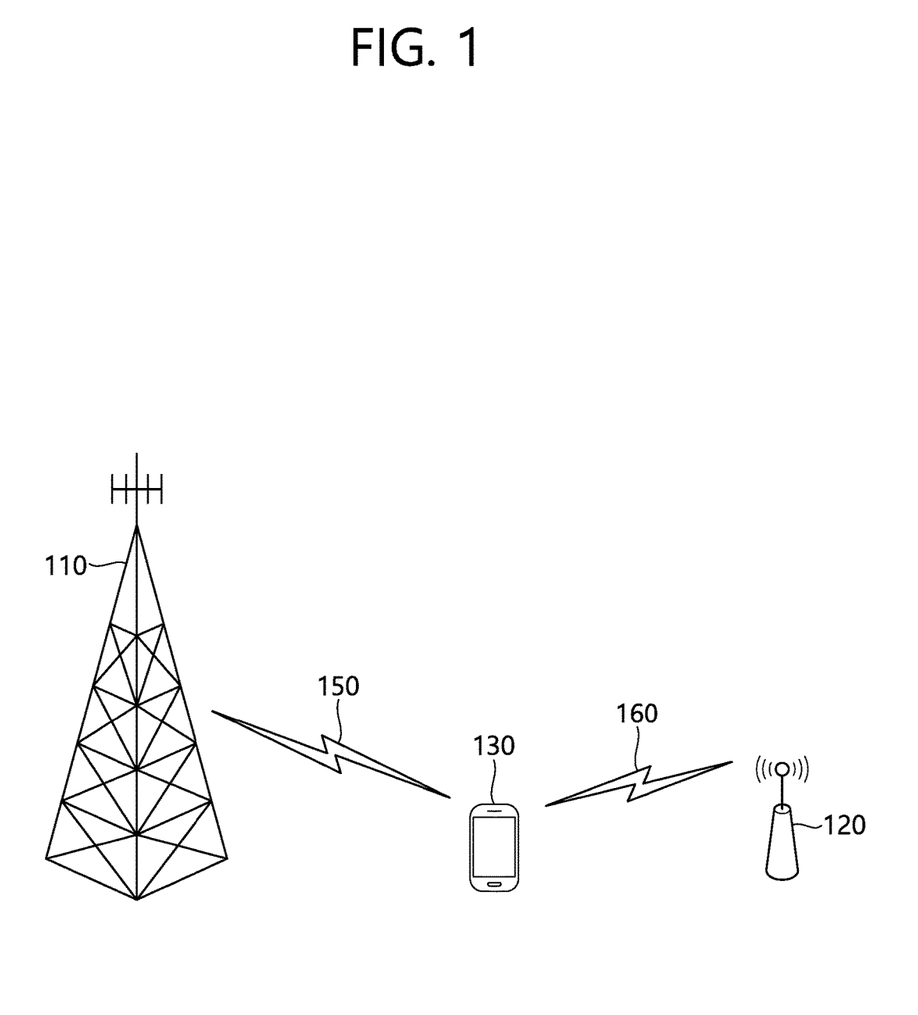
FIG. 1 shows an example of a long term evolution (LTE) service using an unlicensed band.

FIG. 1 shows an example of an LTE service using an unlicensed band.

A wireless device 130 establishes a connection with a $1^{st}$ BS 110, and receives a service through a licensed band. For traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

A cell operating in an unlicensed band is referred to as 'unlicensed cell' and a cell operating in a licensed band is referred to as 'licensed cell'. For clarity, it is assumed that a licensed cell is a primary cell and an unlicensed cell is a secondary cell.

Figure 2:
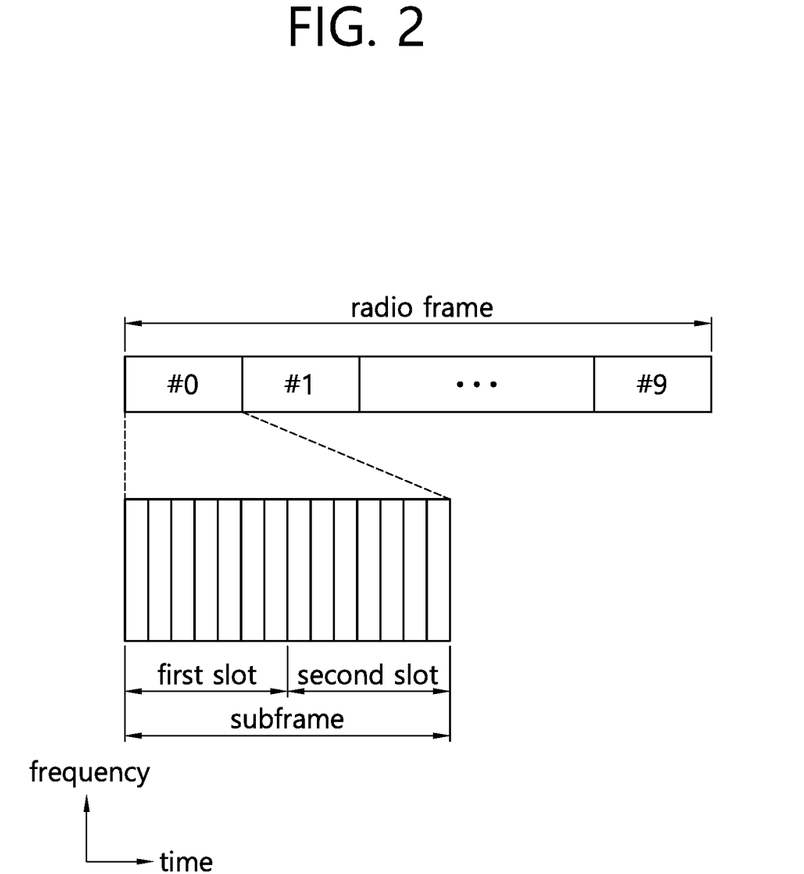
FIG. 2 shows a subframe structure in 3rd generation partnership project (3GPP) LTE.

FIG. 2 shows a subframe structure in 3GPP LTE.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE-A uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one subframe includes 14 OFDM symbols for example, the number of OFDM symbols included in one slot may vary depending on a length of a cyclic prefix (CP). According to 3GPP LTE-A, in case of a normal CP, one subframe includes 14 OFDM symbols, and in case of an extended CP, one subframe includes 12 OFDM symbols.

A resource block (RB) is a resource allocation unit and includes a plurality of subcarriers in one slot. For example, if one slot includes 7 OFDM symbols in a time domain and the RB includes 12 subcarriers in a frequency domain, one RB can include 7×12 resource elements (REs).

Physical channels in 3GPP LTE are classified into a downlink (DL) physical channel and a uplink (UL) physical channel. DL physical channels include a physical downlink control channel (PDCCH), a physical control format indicator channel (PCFICH), a physical hybrid-ARQ indicator channel (PHICH), and a physical downlink shared channel (PDSCH).

The PHICH carries a positive-acknowledgement (ACK)/negative-acknowledgement (NACK) signal for an UL hybrid automatic repeat request (HARQ). The ACK/NACK signal for UL data on a PUSCH transmitted by the wireless device is transmitted on the PHICH.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 3:
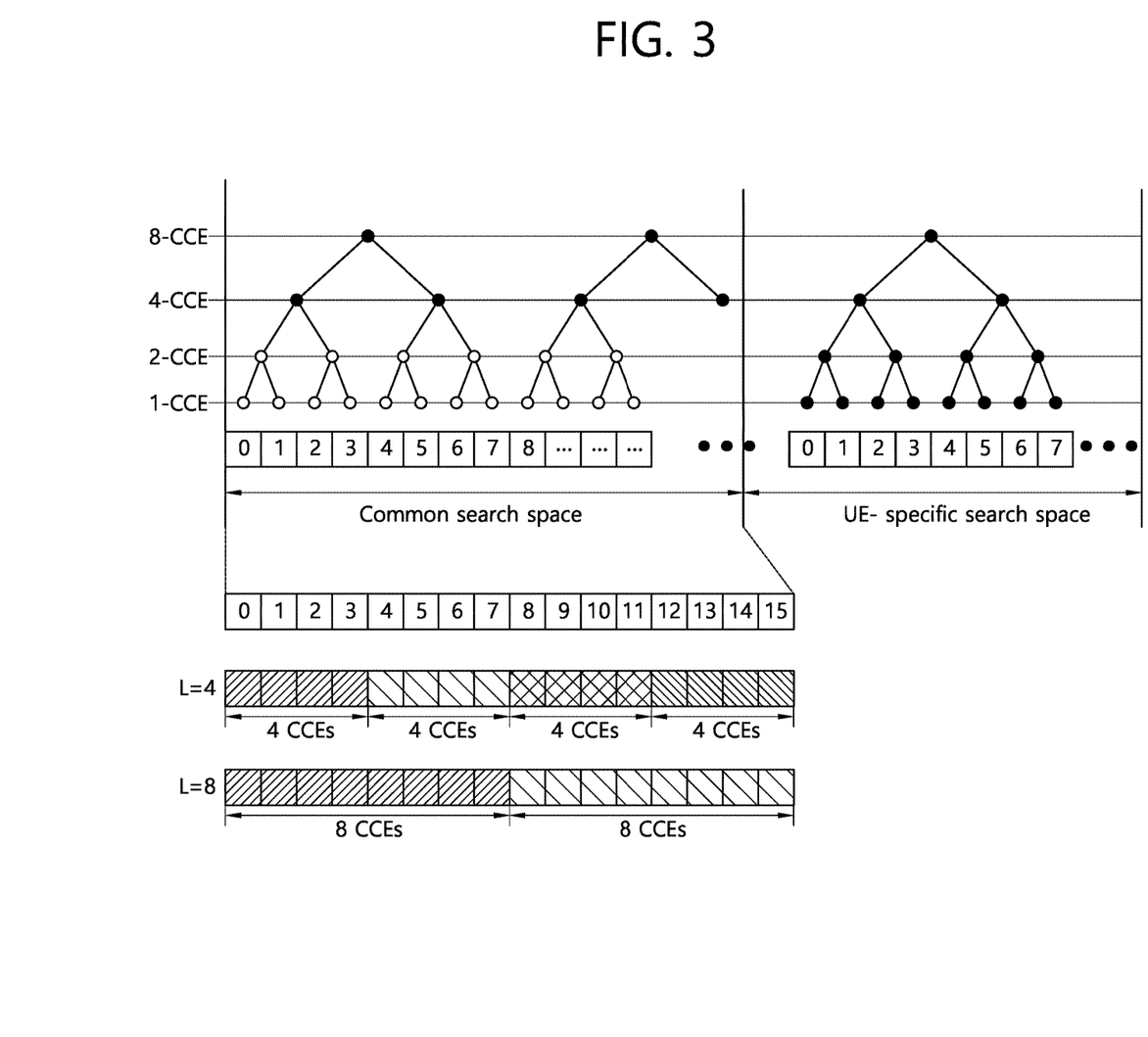
FIG. 3 shows an example of monitoring a physical downlink shared channel (PDCCH) in 3GPP LTE.

FIG. 3 shows an example of monitoring a PDCCH in 3GPP LTE.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined. One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

In a CCE aggregation level $L \in \{1,2,3,4\}$, a search space $S^{(L)}_k$ is defined as a set of PDCCH candidates. A CCE corresponding to a PDCCH candidate m of the search space $S^{(L)}_k$ is given by Equation 1 below.

$$L\{(Y_k+m') \bmod \lfloor N_{CCE,k}/L \rfloor\}+i \qquad \text{[Equation 1]}$$

Herein, i=0, 1, . . . , L−1, and $N_{CCE,k}$ denotes the total number of CCEs that can be used for PDCCH transmission in a control region of a subframe k. The control region includes a set of CCEs numbered from 0 to $N_{CCE,k}-1$. If a carrier indicator field (CIF) is set to the UE-specific search space, $m'=m+M^{(L)}n_{cif}$. Herein, $n_{cif}$ is a value of the CIF. If the CIF is not set to the UE-specific search space, m'=m. m=0, . . . , $M^{(L)}-1$. $M^{(L)}$ denotes the number of PDCCH candidates in a CCE aggregation level L of a given search space.

In a common search space, $Y_k$ is set to 0 with respect to two aggregation levels L=4 and L=8. In a UE-specific search space of the aggregation level L, a variable $Y_k$ is defined by Equation 2 below.

$$Y_k = (A \cdot Y_{k-1}) \bmod D \qquad \text{[Equation 2]}$$

Herein, $Y_{-1}=n_{RNTI} \neq 0$, A=39827, D=65537, k=floor($n_s$/2), and $n_s$ denotes a slot number in a radio frame.

Figure 4:
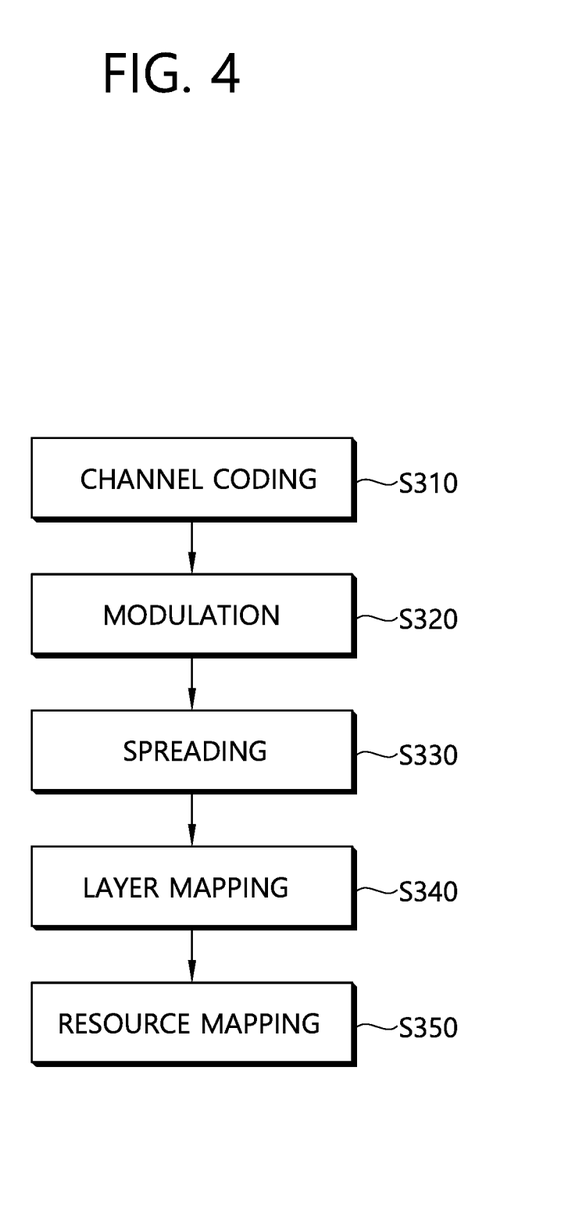
FIG. 4 is a block diagram showing a physical hybrid-ARQ indicator channel (PHICH) in 3GPP LTE.

FIG. 4 shows a structure of a PHICH in 3GPP LTE.

One PHICH carries only 1-bit ACK/NACK corresponding to a PUSCH for one UE, that is, corresponding to a single stream.

In step S310, the 1-bit ACK/NACK is coded into 3 bits by using a repetition code having a code rate of 1/3.

In step S320, the coded ACK/NACK is modulated using binary phase shift keying (BPSK) to generate 3 modulation symbols.

In step S330, the modulation symbols are spread by using an orthogonal sequence. A spreading factor (SF) is $N^{PHICH}_{SF}=4$ in a normal CP case, and is $N^{PHICH}_{SF}=2$ in an extended CP case. The number of orthogonal sequences used in the spreading is $N^{PHICH}_{SF}*2$ to apply I/Q multiplexing. PHICHs which are spread by using $N^{PHICH}_{SF}*2$ orthogonal sequences can be defined as one PHICH group.

In step S340, layer mapping is performed on the spread symbols.

In step S350, the layer-mapped symbols are transmitted by being mapped to resources.

A plurality of PHICHs mapped to resource elements of the same set constitute a PHICH group. Each PHICH included in the PHICH group is identified by a different orthogonal sequence. In the FDD system, $N^{group}_{PHICH}$, i.e., the number of PHICH groups, is constant in all subframes, and can be determined by Equation 3 below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 3]}$$

Herein, Ng denotes a parameter transmitted through a physical broadcast channel (PBCH), where $Ng \in \{1/6, 1/2, 1, 2\}$. $N^{DL}_{RB}$ denotes the number of DL RBs.

The wireless device identifies a PHICH resource by using an index pair ($n^{group}_{PHICH}$, $n^{seq}_{PHICH}$) used by the PHICH. A PHICH group index $n^{group}_{PHICH}$ has a value in the range of 0 to $N^{group}_{PHICH}-1$. An orthogonal sequence index $n^{seq}_{PHICH}$ denotes an index of an orthogonal sequence. An index pair ($n^{group}_{PHICH}$, $n^{seq}_{PHICH}$) is obtained according to Equation 4 below.

$$n_{PHICH}^{group} = (I_{PRB\_RA} + n_{DMRS}) \bmod N_{PHICH}^{group} + I_{PHICH} N_{PHICH}^{group} \quad \text{[Equation 4]}$$

$$n_{PHICH}^{seq} = (\lfloor I_{PRB\_RA} / N_{PHICH}^{group} \rfloor + n_{DMRS}) \bmod 2N_{SF}^{PHICH}$$

Herein, $n_{DMRS}$ denotes a cyclic shift of a demodulation reference signal (DMRS) within the most recent UL grant for a transport block related to corresponding PUSCH transmission. The DMRS is an RS used for PUSCH transmission. $N^{PHICH}_{SF}$ denotes an SF size of an orthogonal sequence used in PHICH modulation. $I^{lowest\_index}_{PRB\_RA}$ denotes the smallest PRB index in a 1$^{st}$ slot of corresponding PUSCH transmission. $I_{PHICH}$ is 0 or 1.

Figure 5:
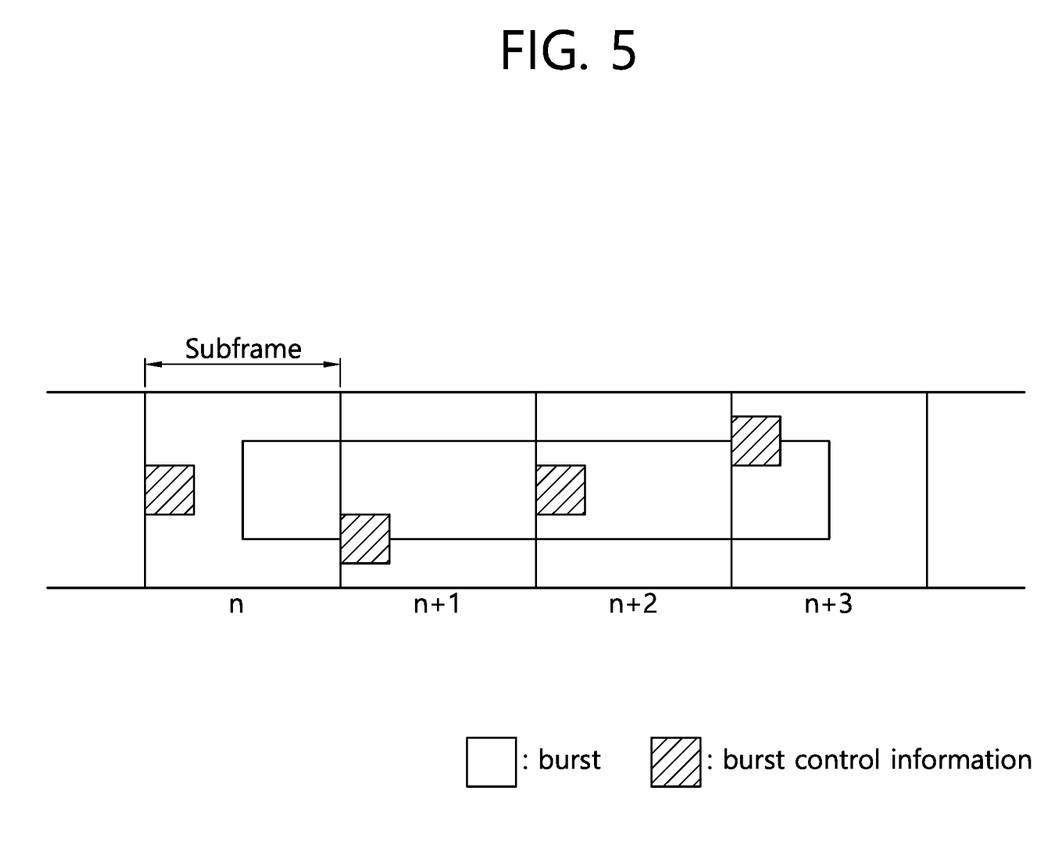
FIG. 5 shows burst transmission in an unlicensed band according to an embodiment of the present invention.

FIG. 5 shows burst transmission in an unlicensed band according to an embodiment of the present invention.

A burst refers to a packet transmitted after CCA is complete, and may be transmitted in one or more consecutive subframes. This may imply that the burst is transmitted on one or more PUSCHs. At the start of the burst, a reservation signal may be transmitted for channel occupation, burst start detection, and time/frequency synchronization.

In the existing 3GPP LTE, the start of DL/UL data transmission is limited to a subframe boundary. However, if data transmission start timing is limited to an OFDM symbol boundary or a subframe boundary in an unlicensed band, another transmitting node may start signal transmission between any time at which a transmission node identifies CCA and a data transmission start time, which may lead to a failure in channel occupation. To prevent this, DL transmission may start immediately after identifying the CCA or within a specific time, rather than the subframe boundary. A case where burst transmission starts in the middle of a subframe is called a partial start subframe. A case where burst transmission ends in the middle of the subframe is called a partial end subframe.

A BS may transmit burst control information in each subframe and/or a subframe in which CCA is successful. The burst control information may include a length of each subframe in a burst, a presence/absence of a reference signal (RS) for measuring channel state information (CSI), a presence/absence of a cell-specific reference signal (CRS), or the like. The burst control information may include information regarding a subframe configuration for a previous subframe and/or a current subframe. The burst control information may include information regarding a duration in which the burst is transmitted (or the number of OFDM symbols for transmitting the burst) in the subframe. The burst control information may include information regarding a duration in which a DL channel (e.g., PDCCH, PDSCH, etc.) is transmitted (or the number of OFDM symbols for transmitting a DL channel) in the subframe.

The burst control information transmitted in a subframe n may indicate a subframe configuration in the subframe n. Alternatively, the burst control information transmitted in the subframe n may indicate a subframe configuration in a subframe n+1. Alternatively, the burst control information transmitted in both the subframe n and the subframe n+1 may indicate a subframe configuration in the subframe n+1.

The burst control information may be transmitted in a licensed cell or an unlicensed cell. The burst control information may be transmitted in a primary cell. Alternatively, the burst control information may be transmitted in an unlicensed band in which a burst is transmitted.

Hereinafter, a structure of a control channel for carrying burst control information in an unlicensed band is proposed.

The Use of PHICH Structure

As described above, in 3GPP LTE, a payload of a PHICH is a 1-bit DL HARQ ACK/NACK. The 1-bit ACK/NACK may be coded into 3 bits by using a repetition code having a code rate of 1/3, and is modulated based on BPSK.

According to the proposed embodiment, burst control information is the payload of the PHICH. In order to transmit the burst control information through the PHICH, the burst control information may be encoded by using a Reed-Muller (RM) code as follows.

$$b_i = \sum_{n=0}^{A-1} (a_n \cdot M_{i,n}) \bmod 2 \quad \text{[Equation 5]}$$

$b_i$ is an encoded bit. $a_n$ is a bit of burst control information. A is the number of bits of the burst control information. $i=0, \ldots, I$, where I is the number of encoded bits. $M_{i,n}$ is a basis sequence for the RM code.

If $I=32$ and $A=11$, then $M_{i,n}$ may be as shown in the following table. This is called a length-32 RM code.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |

TABLE 1-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 1 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

If 1=20 and A=13, then $M_{i,n}$ may be as shown in the following table. This is called a length-20 RM code.

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 1 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

The burst control information may be encoded by repeating or truncating the length-32 RM code or the length-20 RM code. There is no limitation in the length of the RM code, and the length-32 or length-48 RM code may be used.

M PHICHs may be used to transmit the encoded burst control information having a length A.

In a first embodiment, one encoded bit may be transmitted for each PHICH. In this case, M=A. When L PHICHs are used for each PHICH group, the burst control information may be transmitted by using ceiling(M/L) PHICH groups. For example, if L=8, then 3, 3, 4, and 6 PHICH groups may be used respectively for M=20, 24, 32, and 48. Alternatively, when using a plurality of PHICHs belonging to one PHICH group, transmit (TX) power may be significantly concentrated in a frequency resource used by the PHICH, and thus the TX power may be significantly unbalanced in a frequency domain. Therefore, more PHICH groups may be used by applying only a part of orthogonal sequence and I/Q component combinations. Only 1, 2, or 4 orthogonal sequences in the PHICH group may be used (L=1, 2, 4). Only the I/Q components in the PHICH group may be used (L=2).

In a second embodiment, one encoded bit may be transmitted per REG belonging to each PHICH. Since 3 REGs are used for each PHICH, M=ceiling(A/3). When L PHICHs are used for each PHICH group, the burst control information may be transmitted by using ceiling(M/L) PHICH groups. For example, if L=8, then 1, 1, 2, and 2 PHICH groups may be used respectively for M=20, 24, 32, and 48. Alternatively, when using a plurality of PHICHs belonging to one PHICH group, TX power may be significantly concentrated in a frequency resource used by the PHICH, and thus the TX power may be significantly unbalanced in a frequency domain. Therefore, more PHICH groups may be used by applying only a part of orthogonal sequence and I/Q component combinations. Only 1, 2, or 4 orthogonal sequences in the PHICH group may be used (L=1, 2, 4). Only the I/Q components in the PHICH group may be used (L=2).

In a third embodiment, one encoded bit may be transmitted per REG constituting the PHICH.

In a fourth embodiment, two encoded bits may be transmitted using QPSK modulation in the first to third embodiments.

In the first to fourth embodiments, a bit having a high priority in burst control information may be assigned to a most significant bit (MSB). For example, if the burst control information includes higher priority information (information required for (E)PDCCH/PDSCH reception, a subframe configuration, a CRS port/symbol count, etc.), decoding performance of corresponding information may be improved by assigning the high priority information to the MSB.

A different encoding scheme may be applied depending on the number of bits of the burst control information transmitted through the PHICH. If the burst control information is 1 bit, repetition coding is applied. If the burst control information is 2 bits, the following simplex coding is applied.

TABLE 3

| 2-bit burst control information | encoded bit |
| --- | --- |
| 00 | 011 |
| 01 | 101 |
| 10 | 110 |
| 11 | 000 |

If the burst control information is at least 3 bits, the aforementioned RM code is applied. Burst control information which is encoded independently may be transmitted through different PHICHs and/or different PHICH groups.

Tail-biting convolutional coding may be applied to the burst control information transmitted through the PHICH. To reduce an amount of PHICH resources used per subframe, CRC may be omitted, or only one parity bit may be added. Alternatively, CRC of 8 bits or less may be added.

When an encoded bit is transmitted per RE as in the third embodiment, in order to prevent an error of corresponding bits from occurring due to adjacent REs experiencing the same fading channel, block interleaving may be applied before an encoded bit is mapped to each RE. One block interleaving may be applied for each PHICH group or for all PHICH groups. The block interleaving may include operations of writing an input bit in a column-wise manner and generating an output bit in a row-wise manner after being subjected to column permutation. A column and a row may be applied in a reverse order. If the column or row of the interleaving is a multiple of 4 or if the number of PHICH groups is a multiple of 4, a block interleaving size may be determined such that the column or the row is not the multiple of 4 in order to prevent from being re-mapped to the same REG. Alternatively, the encoded bit may be mapped to the RE by applying the interleaving between a plurality of PHICH groups and a plurality of adjacent PHICH REGs.

An OFDM symbol on which the PHICH having the burst control information is transmitted may be limited to a first OFDM symbol of a subframe. PHICH mapping may conform to a case where a PHICH duration is 1 OFDM symbol. If a control region in the subframe is set to 2 OFDM symbols, the PHICH may be limitedly transmitted on only 2 OFDM symbols. When the PHICH duration is set to an extended PHICH duration, the PHICH may always be transmitted on 2 OFDM symbols.

The number of OFDM symbols on which the PHICH is transmitted may be determined according to a duration of a non-MBSFN region of a multicast-broadcast single-frequency network (MBSFN) subframe. If the non-MBSFN region uses one OFDM symbol, the number of OFDM symbols on which the PHICH is transmitted may always be one in all subframes. If the non-MBSFN region uses 2 OFDM symbols, the number of OFDM symbols to which the PHICH is transmitted may always be 2 in all subframes.

In the existing 3GPP LTE, when a BS supports 4 transmit (TX) diversity, antenna diversity is obtained by mapping different PHICH groups to different antenna pairs. When an encoded bit is transmitted per PHICH RE, the antenna diversity may be obtained in such a manner that an adjacent RE pair is mapped to a different antenna pair.

The PHICH having the burst control information may be transmitted only in a specific subframe. RE mapping of the PDCCH or the PDSCH varies depending on whether the UE transmits the PHICH. This is to prevent an error from occurring in reception of another channel when the UE incorrectly detects whether the PHICH is transmitted. REs to be occupied by the PHICH irrespective of whether the PHICH is transmitted may not be used in transmission of the PDCCH or the PDSCH. Alternatively, the UE may detect whether the PHICH is transmitted in each subframe (using CRC check or other conditions), and according to a result thereof, may determine whether the PDCCH or the PDSCH is mapped to up to an RE to be used by the PHICH.

An amount of a PHICH resource having the burst control information may be determined as follows. The amount of the PHICH resource may be set to 0 in the following methods.

In a first embodiment, the BS may deliver the amount of the PHICH resource to the UE through RRC signaling. The amount of the PHICH resource may be expressed by the number of PHICHs, the number of PHICH groups, or the number of REGs constituting the PHICH.

In a second embodiment, the BS may deliver the number of bits of the burst control information or the number of encoded bits of the burst control information to the UE through the RRC signaling. The UE may determine the amount of the PHICH resource through the number of corresponding bits.

The Use of PDCCH Structure

In the 3GPP LTE system, burst control information may be transmitted on a PDCCH or EPDCCH used in DCI transmission. Hereinafter, the PDDCH or EPDCCH for transmitting the burst control information is referred to as a b-PDCCH.

The number of bits of burst control information to be transmitted on the b-PDCCH may be predetermined, or may be informed by a BS to a UE through RRC signaling. A DCI format for the burst control information (this is called a burst DCI format) may be separately determined or the existing DCI format may be re-used. When the number of bits of the burst control information is denoted by A and the number of DCI formats is denoted by Z, then Z>=A. Although the UE decodes the Z-bit burst DCI format, only A bits among them are used as actual burst control information. Z-A bits are reserved bits and thus are not used. For example, if the burst DCI format has the same number of bits as the DCI format 1C, the Z-A bits are the reserved bits.

Figure 6:
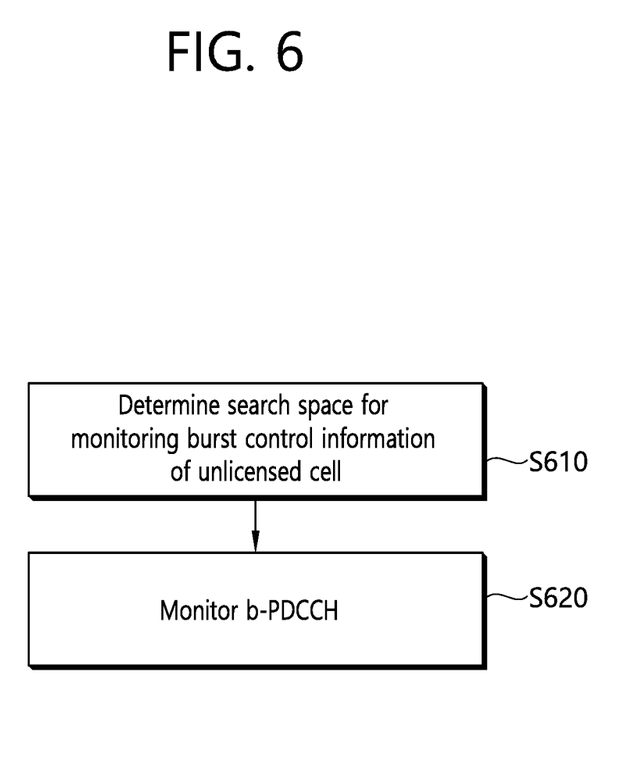
FIG. 6 shows a monitoring method according to an embodiment of the present invention.

FIG. 6 shows a monitoring method according to an embodiment of the present invention.

In step S610, a search space for monitoring burst control information is determined in a control region of a subframe of an unlicensed cell.

In step S620, a b-PDCCH is monitored in the search space. A specific RNTI for the b-PDCCH may be defined, and is referred to as b-RNTI. A UE identifies a CRC error of a PDCCH candidate by using the b-RNTI in the search space. If the error is not detected, a corresponding PDCCH candidate is detected as the b-PDCCH, and the burst control information is decoded.

A CCE aggregation level for configuring the b-PDCCH may be set by RRC signaling. The b-PDCCH may be monitored using a specific aggregation level (L=4 or 8).

The search space for the b-PDCCH may be defined. Alternatively, the b-PDCCH may be monitored in a common search space. More specifically, a location of the PDCCH in which the b-PDCCH is to be monitored may be predetermined also in the search space. For example, the UE may monitor the b-PDCCH only in a first PDCCH candidate in the common search space. For example, it is assumed that a CCE index starts from 0, and the search space starts from a CCE having the CCE index 0. If L=4, the UE monitors the b-PDCCH in PDCCH candidates corresponding to CCE indices 0, 1, 2, and 3. If L=8, the UE monitors the b-PDCCH in PDCCH candidates corresponding to CCE indices 0, 1, 2, 3, 4, 5, 6, and 7. The UE may damask CRC of a corresponding PDCCH candidate, and if there is no CRC error, it may be recognized as the b-PDCCH. A CCE aggregation level and the number of PDCCH candidates may be limited for the monitoring of the b-PDCCH to decrease an overhead based on blind decoding.

The BS may inform the UE of a search space for monitoring the b-PDCCH and/or a location of the PDCCH candidate.

The BS may inform the UE of configuration information regarding the search space for monitoring the b-PDCCH. The configuration information may include a start point of the search space and/or the number of PDCCH candidates.

Since the burst control information has fewer bits than typical DCI, CRC of 8 bits or less may be used.

Information indicating an MBSFN subframe or information indicating whether it is a partial subframe may be masked in the CRC of the b-PDCCH.

In the 3GPP LTE, a PCFICH uses 4 REGs (one REG includes 4 REs adjacent to the maximum extent possible on a frequency axis in 1 OFDM symbol). If the burst control information is 2 bits, the burst control information may be transmitted by using simplex coding as shown in Table 3. If the burst control information is greater than 2 bits, it may be transmitted on a plurality of PCFICHs. The plurality of PCFICHs may be transmitted on one OFDM symbol, or may be transmitted on different OFDM symbols. The burst control information may be encoded using a simplex code or an RM code.

A control region is a region in which a PDCCH/PHICH/PCFICH is transmitted in the subframe. The control region includes up to first 3 OFDM symbols of the subframe. In the 3GPP LTE, the UE may know a duration of the control region through the PCFICH transmitted on a first OFDM symbol of each subframe. In cross-carrier scheduling in which the PDCCH is transmitted in a first cell and the PDSCH is transmitted in a second cell, the UE does not detect the PDCCH or PHICH in the second cell and the duration of the control region is set through RRC signaling. If the second cell is an unlicensed cell, there is a need to define a control region of the unlicensed cell to receive the control channel (PDCCH/PHICH) used in transmission of burst control information.

In the cross-carrier scheduling, the UE may assume previous symbols of an OFDM symbol configured to transmit PDSCH transmission in each subframe as the control region. It is assumed that PDSCH transmission is configured to start from a Kth OFDM symbol in the subframe. The UE may assume that the control region is from a first OFDM symbol to an $R^{th}$ OFDM symbol (R>k). Alternatively, the BS may provide the UE with information regarding the control region used by the control channel used in transmission of the burst control information. In the MBSFN subframe, an OFDM symbol configured to a non-MBSFN region may be assumed as the control region.

If the UE detects a decoding error of the burst control information or detects a discrepancy between the burst control information and DL scheduling information in the CRC check or other methods, the following actions may be taken.

(1) The UE discards reception of a corresponding subframe or a corresponding burst.

(2) The UE ignores corresponding burst control information and conforms to the DL scheduling information.

(3) The UE attempts to perform reception according to a configuration predetermined in a corresponding subframe or a corresponding burst. The predetermined configuration may include a configuration for an MBSFN/non-MBSFN subframe, a configuration for a subframe length, and a configuration for whether an RS exists for CSI measurement. For example, the UE may assume that the corresponding subframe is the non-MBSFN subframe and is not a partial subframe, and that all RSs configured for CSI measurement are present.

Now, transmission of reference signal (RS) TX power will be described. TX power of an RS (CRS, CSI-RS, DRS, etc.) in an unlicensed ell may vary on a burst basis. Burst control information may include information regarding the RS TX power. An RS transmitted periodically for DL synchronization such as a discovery RS (DRS) may use TX power which is fixed for a long period of time instead of changing the TX power dynamically. The TX power may be given by RRC signaling. That is, TX power of the CRS/CSI-RS constituting the DRS may be delivered to the UE by RRC signaling. This may be delivered to the UE in such a manner that CRS TX power delivered by RRC signaling is limitedly applied only to the CRS for the DRS. A relationship between CRS TX power and PDSCH TX power and a relationship with CSI-RS TX power may be limitedly applied only to a subframe in which the DRS is transmitted or may be applied to all subframes. The BS may inform the UE of whether the CRS TX power is limited in a subframe in which the DRS is transmitted, through the RRC signaling. The UE may calculate a path loss between the BS and the UE by using the relationship between receive (RX) power of the RS transmitted through the DRS and RS TX power determined by the RRC signaling, and may utilize it to compensate for the path loss in UL TX power.

Figure 7:
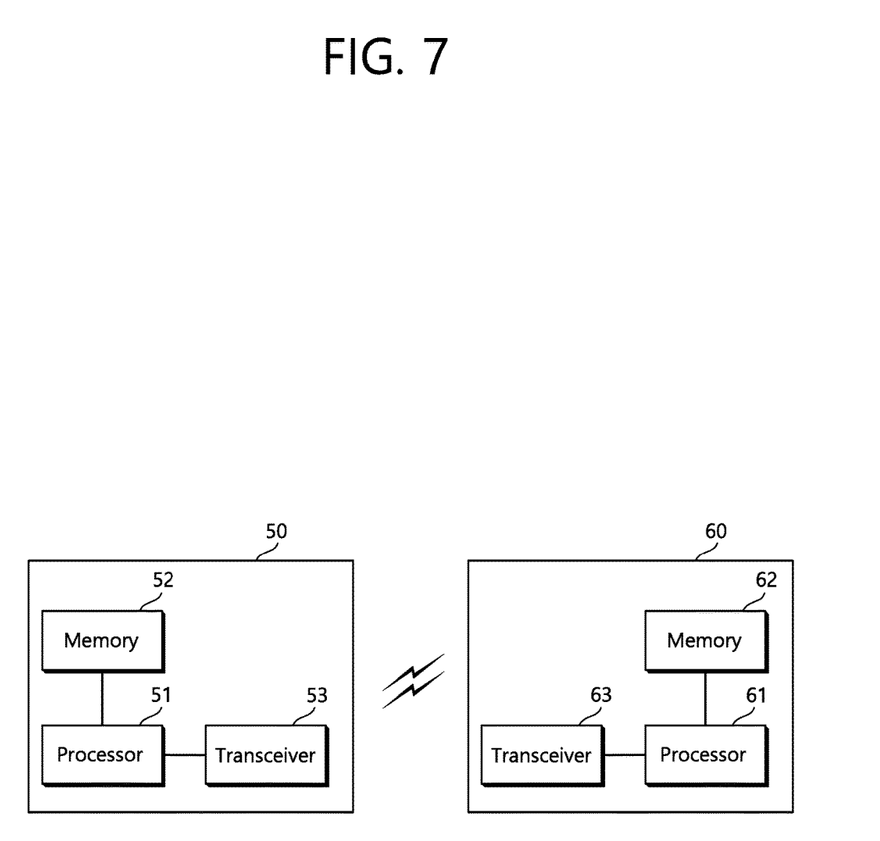
FIG. 7 is a block diagram showing a wireless communication system for implementing an embodiment of the present invention.

FIG. 7 is a block diagram showing a wireless communication system for implementing an embodiment of the present invention.

A wireless device 50 includes a processor 51, a memory 52, and a radio frequency (RF) unit 53. The memory 52 is coupled to the processor 51, and stores various instructions executed by the processor 51. The RF unit 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and an RF unit 63. The BS 60 may operate in a licensed band and/or an unlicensed band. The memory 62 is coupled to the processor 61, and stores various instructions executed by the processor 61. The RF unit 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for monitoring a control channel in a wireless communication system, the method comprising:
   determining, by a user equipment (UE), a search space for monitoring a physical downlink control channel (PDCCH) in a first subframe of a licensed-assisted access (LAA) secondary cell; and
   monitoring, by the UE, the PDCCH in the search space of the first subframe of the LAA secondary cell,
   wherein the PDCCH carries burst control information that includes information on a subframe configuration for the first subframe and a second subframe of the LAA secondary cell, the second subframe being a next subframe of the first subframe,
   wherein the first subframe includes a plurality of control channel elements (CCEs) starting from an index 0, and
   wherein the search space is defined in a single PDCCH candidate given by CCEs numbered from an index 0 at each aggregation level.

2. The method of claim 1, wherein the search space is defined in at least one of a first PDCCH candidate at an aggregation level 4 and a second PDCCH candidate at an aggregation level 8, the first PDCCH candidate given by four CCEs numbered 0, 1, 2, 3, the second PDCCH candidate given by eight CCEs numbered 0, 1, 2, 3, 4, 5, 6, 7.

3. The method of claim 1, wherein the subframe configuration for the first subframe and the second subframe indicates a number of orthogonal frequency division multiplexing (OFDM) symbols used for transmission of downlink channels in the first subframe and the second subframe.

4. The method of claim 1, wherein a radio network temporary identifier (RNTI) is masked to a cyclic redundancy check (CRC) of the burst control information.

5. The method of claim 1, wherein the burst control information is common control information common to all UE's in the LAA secondary cell.

6. The method of claim 1, further comprising:
   activating, by the UE, the LAA secondary cell by receiving an instruction from a primary cell.

7. An apparatus for monitoring a control channel in a wireless communication system, the apparatus comprising:
   a transceiver configured to transmit and receive a radio signal; and
   a processor coupled to the transceiver and configured to:
   determine a search space for monitoring a physical downlink control channel (PDCCH) in a first subframe of a licensed-assisted access (LAA) secondary cell; and
   control the transceiver to monitor the PDCCH in the search space of the first subframe of the LAA secondary cell,
   wherein the PDCCH carries burst control information that includes information on a subframe configuration for the first subframe and a second subframe of the LAA secondary cell, the second subframe being a next subframe of the first subframe,
   wherein the first subframe includes a plurality of control channel elements (CCEs) starting from an index 0, and
   wherein the search space is defined in a single PDCCH candidate given by CCEs numbered from an index 0 at each aggregation level.

8. The apparatus of claim 7, wherein the search space is defined in at least one of a first PDCCH candidate at an aggregation level 4 and a second PDCCH candidate at an aggregation level 8, the first PDCCH candidate given by four CCEs numbered 0, 1, 2, 3, the second PDCCH candidate given by eight CCEs numbered 0, 1, 2, 3, 4, 5, 6, 7.

9. The apparatus of claim 7, wherein the subframe configuration for the first subframe and the second subframe indicates a number of orthogonal frequency division multiplexing (OFDM) symbols used for transmission of downlink channels in the first subframe and the second subframe.

10. The apparatus of claim 7, wherein a radio network temporary identifier (RNTI) is masked to a cyclic redundancy check (CRC) of the burst control information.

11. The apparatus of claim 7, wherein the burst control information is common control information common to all user equipments in the LAA secondary cell.

12. The apparatus of claim 7, wherein the processor is configured to activate the LAA secondary cell by receiving an instruction from a primary cell.

* * * * *